United States Patent
DiCarlo et al.

(10) Patent No.: US 7,427,428 B1
(45) Date of Patent: Sep. 23, 2008

(54) INTERPHASE FOR CERAMIC MATRIX COMPOSITES REINFORCED BY NON-OXIDE CERAMIC FIBERS

(75) Inventors: James A. DiCarlo, North Olmsted, OH (US); Ramakrishna Bhatt, North Olmstead, OH (US); Gregory N. Morscher, Stow, OH (US); Hee-Mann Yun, North Olmstead, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 411 days.

(21) Appl. No.: 10/601,657

(22) Filed: Jun. 24, 2003

(51) Int. Cl.
*B05D 3/02* (2006.01)
*B32B 9/04* (2006.01)
*D02G 3/02* (2006.01)
*C04B 35/80* (2006.01)

(52) U.S. Cl. ............... 427/376.1; 427/372.2; 427/374.1; 427/376.2; 427/376.6; 428/367; 428/368; 501/95.3; 501/96.1; 501/96.3; 501/96.4

(58) Field of Classification Search ............... 427/376.2, 427/380, 419.8, 427; 428/216, 697, 699, 428/702, 704, 336
See application file for complete search history.

(56) References Cited

U.S. PATENT DOCUMENTS

| | | | |
|---|---|---|---|
| 4,397,901 A * | 8/1983 | Warren | 428/101 |
| 4,944,904 A | 7/1990 | Singh et al. | |
| 5,098,871 A * | 3/1992 | Ray | 501/95.2 |
| 5,134,020 A * | 7/1992 | Cotteret et al. | 428/212 |
| 5,476,685 A * | 12/1995 | Rocher et al. | 427/249.2 |
| 5,514,453 A * | 5/1996 | Goujard et al. | 428/213 |
| 5,580,643 A | 12/1996 | Kennedy et al. | |
| 5,585,165 A | 12/1996 | Kennedy et al. | |
| 5,682,594 A | 10/1997 | Kennedy et al. | |
| 5,738,951 A | 4/1998 | Goujard et al. | |
| 5,840,221 A | 11/1998 | Lau et al. | |
| 5,945,166 A * | 8/1999 | Singh et al. | 427/376.2 |
| 5,948,516 A * | 9/1999 | Kriven et al. | 428/216 |
| 6,228,453 B1 | 5/2001 | Fareed et al. | |
| 6,245,424 B1 | 6/2001 | Lau et al. | |
| 6,277,440 B1 * | 8/2001 | Reynolds | 427/226 |
| 6,309,994 B1 * | 10/2001 | Marra et al. | 501/95.2 |
| 6,506,483 B1 * | 1/2003 | Fehrenbacher et al. | 428/293.4 |

OTHER PUBLICATIONS

Nicalon, About: Composites / Plastics, http://composite.about.com/library/glossary/n/bldef-n3600.htm).*
*Silicon Carbide Continuous Fiber, Nippon Carbon C., LTD,* http://www.carbon.co.jp/english/products/develop/develop.html ).*

* cited by examiner

*Primary Examiner*—Milton I. Cano
*Assistant Examiner*—Brett A Crouse
(74) *Attorney, Agent, or Firm*—Squire, Sanders & Dempsey, L.L.P.

(57) ABSTRACT

A ceramic matrix composite material is disclosed having non-oxide ceramic fibers, which are formed in a complex fiber architecture by conventional textile processes; a thin mechanically weak interphase material, which is coated on the fibers; and a non-oxide or oxide ceramic matrix, which is formed within the interstices of the interphase-coated fiber architecture. During composite fabrication or post treatment, the interphase is allowed to debond from the matrix while still adhering to the fibers, thereby providing enhanced oxidative durability and damage tolerance to the fibers and the composite material.

8 Claims, 6 Drawing Sheets

INTERPHASE FOR CERAMIC MATRIX COMPOSITES REINFORCED BY NON-OXIDE CERAMIC FIBERS

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of Invention

The present invention relates to ceramic materials where the materials are ceramic matrix composites reinforced by continuous-length small-diameter ceramic fibers that are formed in complex shaped architectures by conventional textile processes. In particular, the present invention is based on improving the damage tolerance and oxidative durability of ceramic matrix composites consisting of non-oxide or oxide ceramic matrices reinforced by ceramic fibers with non-oxide chemical compositions.

2. Description of Related Art

As power and propulsion systems advance, there are many applications that require new materials that are expected to withstand high stresses for extended times at higher temperatures than state-of-the-art metallic alloys (above ~1100° C.). Such requirements generally arise in commercial, industrial, and military areas requiring improved engines for transportation, energy production, and energy conversion. This is particularly true for aero-based and land-based gas turbine engines, where improving efficiency and reducing emissions is accomplished by raising the temperature capability of the material in hot section components like combustors, vanes, and blades that must also function under high mechanical, thermal, and aerodynamic stresses. Most of these high temperature applications also have oxidative service conditions due to the combustion of fuel and oxygen and to the cooling of components by ambient air. Oxidative conditions can also occur in space-based engines where one burns hydrogen or jet fuel in oxygen obtained from the liquid state.

Ceramic composites with oxidation-resistant ceramic matrices reinforced by complex architectures of continuous-length fibers with non-oxide chemical compositions, such as silicon carbide (SiC), have many of the desired properties for these applications and compete against monolithic ceramic materials with similar compositions as the matrices. However, the monolithic materials often fracture catastrophically and so fiber-reinforced composite materials are generally required for graceful failure and significantly improved toughness and damage tolerance. This enhancement arises from the deposition of a thin mechanically weak coating or interphase on the fibers to cause random cracks in the ceramic matrix to be deflected around the fibers, thereby allowing the fibers to remain intact, to bridge the matrix cracks, and to carry the structural loads applied to the composite. Although other fiber types based on high-temperature oxide compositions can be used to bridge cracks, at temperatures above 1100° C. current state-of-the-art oxide fibers creep and rupture at significantly lower stresses than non-oxide fibers with such base compositions as SiC, silicon nitride ($Si_3N_4$), and carbon. Thus non-oxide fiber-reinforced ceramic matrix composites, such as SiC fiber-reinforced SiC matrix composites (SiC/SiC), are currently gaining the most technical interest for replacing metallic alloys for the hot-section components of advanced power and propulsion systems. Because of the complex shapes of these components and the need for reinforcing fibers in multi directions, conventional textile processes such as weaving and braiding are generally required in order to form net-shape fiber-architecture preforms that are eventually infiltrated with the ceramic matrix material.

One potential issue with non-oxide fibers is that if the ceramic matrix composite is cracked by unforeseen stresses, the crack-bridging fibers and their interphases will be exposed to oxidizing environments that enter the composite through matrix cracks that terminate at the composite surface. If the matrix cracks are also allowed to reach the fiber surfaces, the oxygen will attack the non-oxide fibers by forming volatile oxides or forming performance-degrading oxide layers on the fiber surface. Ceramic materials with Si-based compositions are the most resistant to oxygen in that their oxide layers with compositions based on silicon dioxide (i.e., silica) are the slowest to grow of any non-oxide ceramic. Thus, for long-term service of cracked composites, fibers based on SiC and $Si_3N_4$ are the most preferred of all the non-oxide fibers. However, although silica growth is slow, even a small amount can cause contacting fibers to bond to each other and to Si-based matrices, thereby eliminating the ability of each fiber to act independently. The detrimental consequence is that if one fiber should fracture prematurely, all others to which it is bonded will fracture, causing catastrophic composite fracture or rupture at low stresses and short times. This oxidation issue for Si-based fibers typically begins at intermediate temperatures (600 to 800° C.) where the silica formation is slow but sufficient to cause fiber-fiber and fiber-matrix bonding.

To minimize the intermediate temperature oxidation problem for composites reinforced by non-oxide fibers, prior art contains a variety of approaches to prevent the cracks from reaching the fiber surfaces (e.g., patents: Goujard et al., U.S. Pat. No. 5,738,951; Fareed et al., U.S. Pat. No. 6,228,453 and in the literature: H. W. Carpenter and J. W. Bohlen, Ceramic Engineering and Science Proceedings, vol. 13, no. 7-8, pp. 23-36 (1992)). For these approaches, the general objective is to design an interphase structure so that prior to the crack reaching the fiber, local mechanical contact between the fiber and matrix is lost either within the interphase structure or on the outside of the interphase (outside debonding). The remaining interphase material on the fiber surface will then slow down silica formation on the fiber, provided the interphase composition can provide some oxidative stability. A typical approach of prior art is to deposit multi-layer interphases on the fibers that consist of thin oxidation-resistant layers like SiC separated by thin and weak crack deflection layers like carbon, boron nitride, or porous oxides (U.S. Pat. Nos. 5,738,951 & 6,228,453). However, all prior art patents related to the use of the outside debonding mechanism are based on the interphase debonding from the matrix to occur during matrix crack propagation, thus requiring similar microstructure conditions to exist locally near every interphase, even for complex fiber architectures produced by conventional textile processes.

SUMMARY OF THE INVENTION

The present invention seeks to improve the oxidative durability of ceramic matrix composite materials reinforced by non-oxide fibers in a more reliable and more cost-effective manner than prior art. To accomplish this, the present invention, in two embodiments, creates simple constituent and process conditions for composite fabrication that assure that the interphases are already outside debonded from the matrices in the as-fabricated materials. Even though the interphases are debonded, load transfer between the fibers and matrix and high composite strength are still maintained due to the complex fiber architectures which allow the interphases to mechanically slide against the matrix during the application of stress. Thus, when the material does crack, the complete interphase is retained on top of each fiber so that the oxidation can be reliably slowed from reaching the fiber. In comparison to prior art, this invention avoids the fabrication of complex interphase compositions and structures, does not rely on uncertain microstructural conditions for in-situ matrix crack deflection, and provides more reliable retention of the total interphase on the fiber surface.

According to one aspect of this invention, composite process and constituent conditions are disclosed which provide significant improvement for the oxidative durability of state-of-the-art SiC/SiC ceramic matrix composites after cracking in air at intermediate temperatures. The interphase material based on boron nitride (BN) compositions is allowed to debond from the SiC matrix (outside debonding) and remain on the SiC fiber surface after composite fabrication and during composite oxidation testing. The composite structural life is significantly enhanced over the normal situation where during testing of the same composite systems, the matrix cracks deflected inside the interphase (inside debonding), thereby allowing direct access of oxygen to the fiber surfaces.

Additionally, two exemplary embodiments, A and B, of the invention are disclosed. Both rely on the proper selection of constituent materials and composite fabrication processes in order to develop internal residual stresses during and after ceramic composite fabrication that eventually create outside debonded interphases in the finished composite product.

According to Embodiment A, a very thin layer with a weak composition (such as carbon) is formed during composite fabrication on top of an interphase material with a composition that forms relatively stable oxides (such as BN-based compositions). The matrix composition is then chosen so that residual tensile stresses can develop between the interphase and matrix during matrix consolidation and composite cool down to room temperature. The tensile stresses should be high enough and/or the interphase over-coating weak enough to cause outside debonding during composite fabrication while retaining interphase bonding to the fiber surface.

According to Embodiment B, a method of forming a ceramic matrix composite is disclosed and includes the initial step of selecting non-oxide fiber types that are microstructure and performance stable to temperatures above the intended composite maximum service temperature. The next steps are to deposit an oxidatively stable but thermally unstable, i.e., not fully crystalline, coating on the fibers (such as BN-based compositions produced at low temperature), and to form the final ceramic matrix at temperatures well below the upper stability temperature of the fibers. The final composite is then heat treated at temperatures up to the upper stability temperature of the fibers. During heat treatment the dimensionally unstable interphase will densify and shrink towards the fiber, thereby developing residual tensile stresses between the interphase and matrix. By controlling such processes as the interphase deposition temperature and the time and temperature of heat treatment, the residual tensile stresses can be made large enough to cause outside debonding of the interphase after composite fabrication and post-treatment.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures:

FIG. 2 (a) shows good pullout indicating good toughness; FIG. 2 (b) shows an example of Embodiment A; and FIG. 2 (c) shows an example of Embodiment B;

DETAILED DESCRIPTION OF PREFERRED EMBODIMENTS

Figure 1:
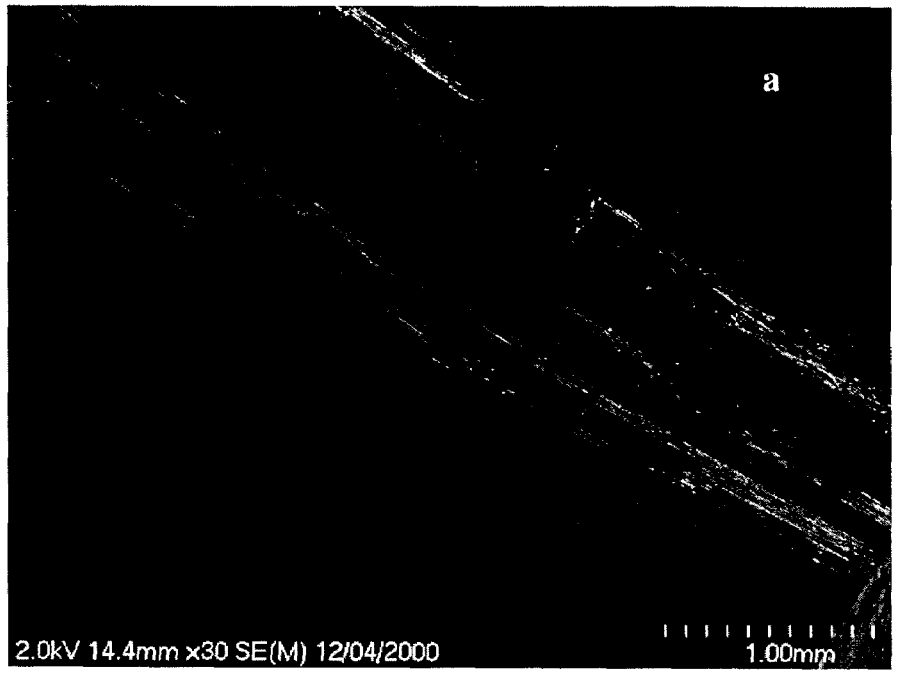
FIG. 1 provides an example of the fracture surface for a SiC/SiC composite which shows typical inside debonding between the SiC fibers and BN-based interphases, with FIG. 1 (a) showing a low magnification with little fiber pullout across the entire fracture surface and FIG. 1 (b) showing a higher magnification where the fiber surfaces are bare and the BN interphases adhere to the matrix. It should be noted that not all inside debonding SiC/SiC composites have small pullout. However, small pull-out is typically the case for those SiC fiber types which offer the desirable property of little or no carbon on their surfaces after composite fabrication.
Figure 1:
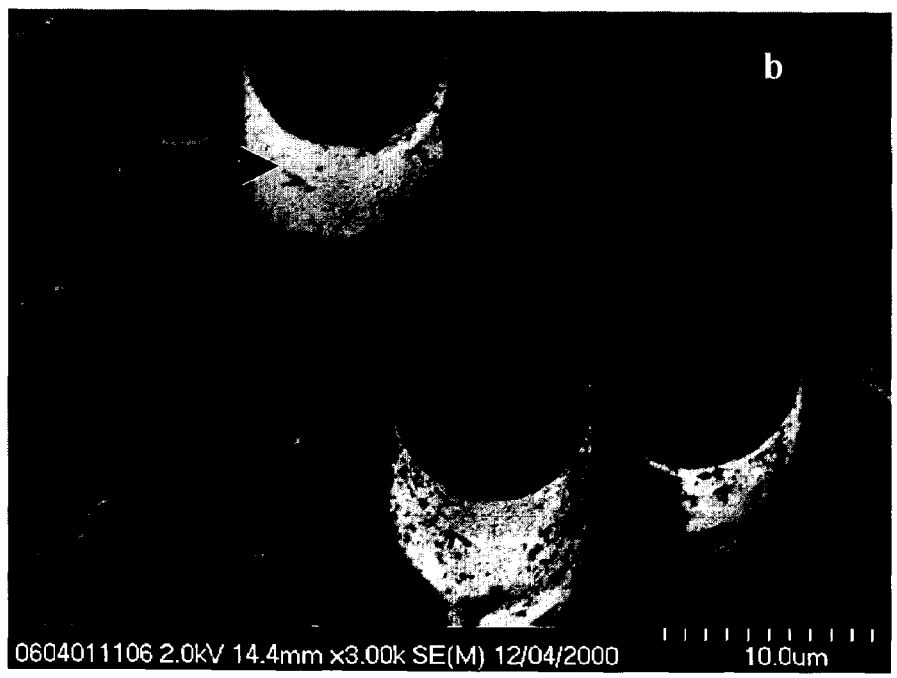

In its most general description, the present invention is directed toward improving the oxidative durability of ceramic matrix composites consisting of non-oxide ceramic fibers in non-oxide and oxide ceramic matrices. It functions by coating the fibers with an interphase material that can provide added oxidation resistance to the fibers, and by providing two residual stress methods to achieve debonding between the interphase coating and the matrix (outside debonding) during composite processing and not afterward. The primary technical advantage of outside debonding is that during cracking of the matrix under service in oxidative environments, the protective interphase coating will remain on top of the crack-bridging fibers, thereby providing the fibers and composite with longer life than the typical case in which debonding occurs between the interphase coating and fiber (inside debonding). Other technical advantages, which can be seen on composite stress-strain curves (such as those of FIG. 3), include lower composite elastic modulus that reduces thermal stresses developed in the composite during high temperature service, and higher fracture strain that increases the composite toughness and damage tolerance.

The first exemplary Embodiment A of the present invention uses residual tensile stresses between the fiber and matrix, plus the addition of a weak interfacial layer on top of the interphase to cause outside debonding during composite processing. The second exemplary Embodiment B incorporates the addition of a special post-fabrication heat-treatment that causes shrinkage of the interphase towards the fiber, so that the resulting residual tensile stresses allow the interphase to pull away or debond from the matrix. What is unique about both of these approaches is that the interphase is already debonded, i.e., a microscopically small gap exists between the coating and the matrix by the time the final composite is fabricated. In other multi-layer interphase concepts using debonding at an outer layer, it is expected that debonding will occur only when a crack propagates through the matrix. This typically occurs during application or testing of the already produced composite, not prior to the finished product. In comparison, the present invention assures the debonding location, while the other concepts must rely on various uncontrollable factors to assure the interphase remains on the fibers.

These two residual stress approaches have been demonstrated in state-of-the-art SiC/SiC composites, which are targeted for hot-section components in advanced gas turbine engines. Typical process steps for these composites are as follows:

(1) A thin, oxidation-stable BN interphase is deposited on a complex array of near-stoichiometric SiC fibers by chemical vapor infiltration (CVI) at temperatures below 1000° C. Some SiC fiber types like Hi-Nicalon are non-stoichiometric (C/Si>1) with maximum production temperatures below 1400° C.; while others are near-stoichiometric (C/Si ~1), like Sylramic®, Sylramic-iBN, and Hi-Nicalon Type S with maximum production temperatures above 1600° C.

(2) A thin layer of SiC matrix is then CVI deposited near 1000° C. on top of the BN interphase. Typically the CVI SiC is near-stoichiometric or silicon-rich in its bulk, but can be made carbon-rich on its surfaces.

(3) Remaining porosity (~30%) in the composite preform (SiC fiber+CVI BN+CVI SiC) is then filled by SiC particulate infiltration at room temperature and finally by melt infiltration (MI) of silicon at temperatures near 1400° C. Other porosity filling approaches for the preform are also possible, including complete CVI SiC, polymer-derived SiC, or complete MI of silicon with no particulate.

It should be noted that whenever the above composite fabrication steps are employed without the introduction of this invention, the resulting SiC/SiC composites typically display inside debonding as shown in FIG. 1.

Figure 5:
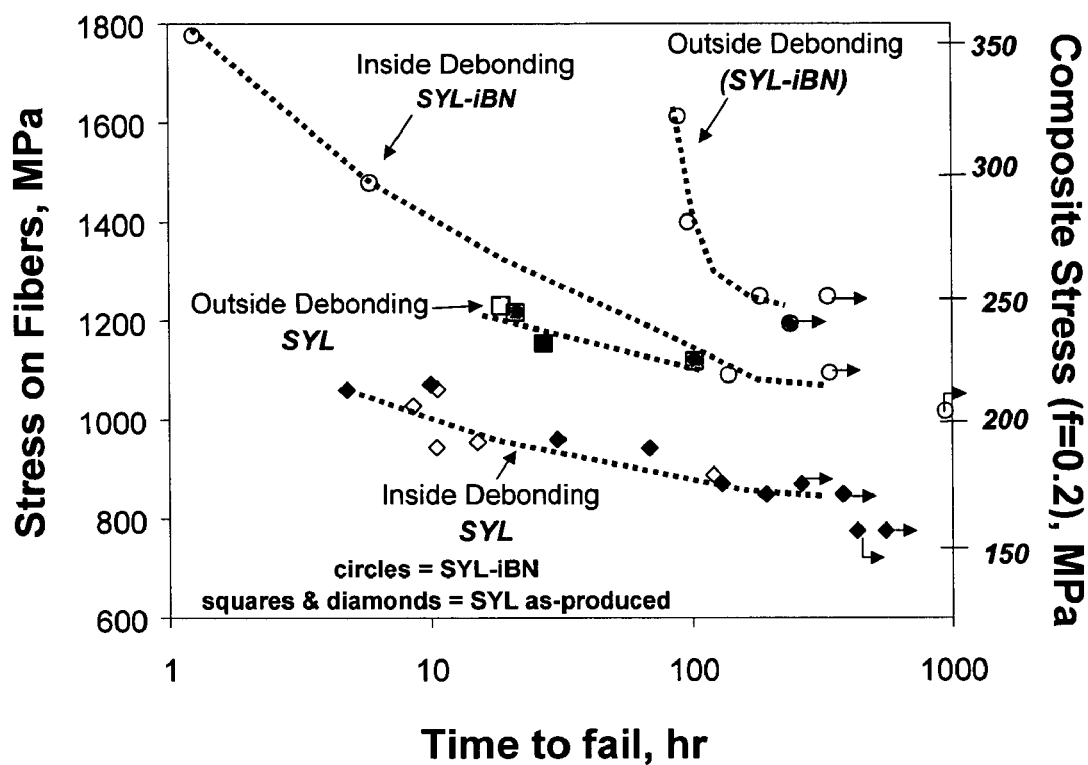
FIG. 5 illustrates stress-rupture curves at 815° C. in air for inside and outside debonded SiC/SiC composites reinforced by "Sylramic®" (SYL) and "Sylramic-iBN (SYL-iBN)" SiC fibers.

For SiC/SiC composites to be more technically useful, it is desirable that the fibers maintain the highest strength possible and decouple from the matrix during the propagation of matrix cracks. That is, high tensile strength and high damage tolerance for the composites depend on the fact that the formation of matrix cracks does not cause fiber failure, so that when random matrix cracks occur, the full set of available fibers can carry the entire composite structural load. Typically, fiber decoupling (or debonding) from the matrix occurs between the fiber and the BN interphase, that is, inside debonding (FIG. 1). However, as shown in FIG. 5, this leads to poor elevated temperature behavior because the surfaces of the fibers are exposed directly to the environment; in particular oxygen and water vapor from the engine environments. To minimize this problem, this innovation was developed and demonstrated as described in the following.

Embodiment A: Outside debonding during composite processing due to residual tensile stresses between fiber and matrix Although the SiC fiber and CVI SiC matrix have very similar thermal expansion, the free silicon in the matrix porosity changes volume on cooling from the melt and has a measurably lower thermal expansion than SiC. Thus with solid silicon in the porosity of the CVI SiC matrix, the net expansion of the matrix is reduced below that of the fiber. Upon cool down to room temperature, this expansion mismatch as well as the volume change during silicon solidification will cause residual tensile and shear stresses across the matrix-BN and BN-fiber interfaces. Debonding at either of these interfaces will occur during cool down depending on whether one of the interfaces is weak enough to fail. However, if the strengths of these interfaces are too great, they then will remain bonded.

Figure 2:
FIG. 2 illustrates examples of fracture surfaces for SiC/SiC composites where outside debonding occurs between the BN interphases and the SiC matrix.
Figure 2:
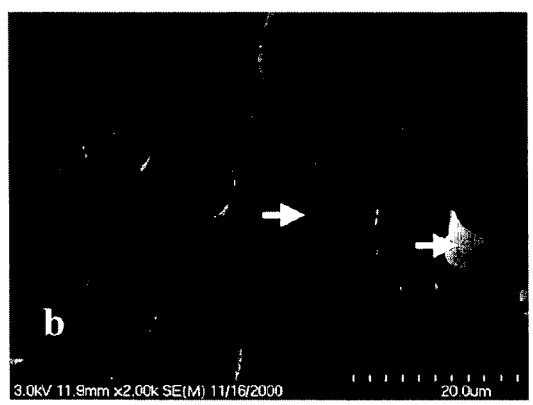
Figure 2:
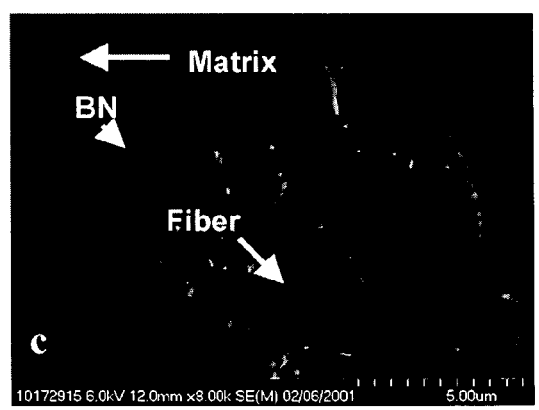

In order to achieve outside debonding between the BN interphase and the CVI SiC matrix, this innovation proposes to tailor this interface in such a way so that it is weaker than the BN-fiber interface and weak enough to debond during composite cooling from molten Si infiltration temperature (>1400° C.). One way to achieve this is by the presence of a small amount of carbon either by the formation of an additional carbon layer on top of the BN interphase or by the deposition of a carbon-rich SiC matrix at the beginning of CVI matrix deposition. An example of this outside debonding approach is shown in FIG. 2b. Thus the key aspects of Embodiment A are (1) to provide a matrix with a lower thermal expansion than the fiber, either by composition selection or by the addition of low expansion porosity fillers, and (2) to provide a weak layer at the interphase-matrix interface to allow outside debonding to occur during cool down from the maximum process temperature for the composite.

Embodiment B: Outside debonding during composite processing due to thermally induced densification and contraction of the interphase BN interphase deposition typically occurs at a temperature lower than the temperature typically employed for CVI SiC matrix formation (~1000° C.), which in turn is lower than the maximum production temperatures for some near-stoichiometric SiC fiber types (>1600° C.). Thus, by exposing the BN interphase to CVI SiC process temperatures and even higher, significant shrinkage (sintering or densification) of the BN will occur due to crystallization and grain growth of the BN, but the microstructures of the near stoichiometric SiC fibers will remain stable. When this happens, the BN typically shrinks towards the fibers, thereby developing a tensile residual stress between the BN coating and CVI SiC matrix. Since the heat-treatment temperature controls the BN shrinkage, this innovation proposes to use temperatures high enough to create a sufficiently high tensile stress to cause outside debonding at the BN/CVI SiC interface, but low enough to retain the as-produced strength of the reinforcing SiC fiber. This will then leave a gap between the BN and CVI SiC. An example of this is shown in FIG. 2c in which a composite preform was heat-treated at 1700° C. which is well above the maximum BN deposition temperature. It should be noted that the SiC fibers and CVI SiC matrix are fully dense and more thermally stable than the BN, and thus will not shrink at all or as much as the BN. Thus the key aspects of this approach are (1) to form a structurally un-stable interphase at a given temperature on a highly stable fiber, (2) to form a matrix such as CVI SiC on top of the interphase at a temperature lower than the maximum process temperature for the fiber; and (3) to heat treat the interphase within the matrix to a sufficiently high temperature so that interphase densification and shrinkage allows it to outside debond from the matrix while the fiber retains its as-produced properties.

Both exemplary Embodiments A and B described here have been applied to SiC fiber reinforced SiC matrix composites. They in principle can also be applied to carbon and $Si_3N_4$ fiber reinforced composites with BN interphase coatings. This should enable enhanced oxidation protection for these systems at intermediate temperatures (~500° C. to 1000° C.).

Demonstration of Improved Composite Properties with Invention

Improvement in SiC/SiC Composite Toughness and Damage Tolerance

Figure 3:
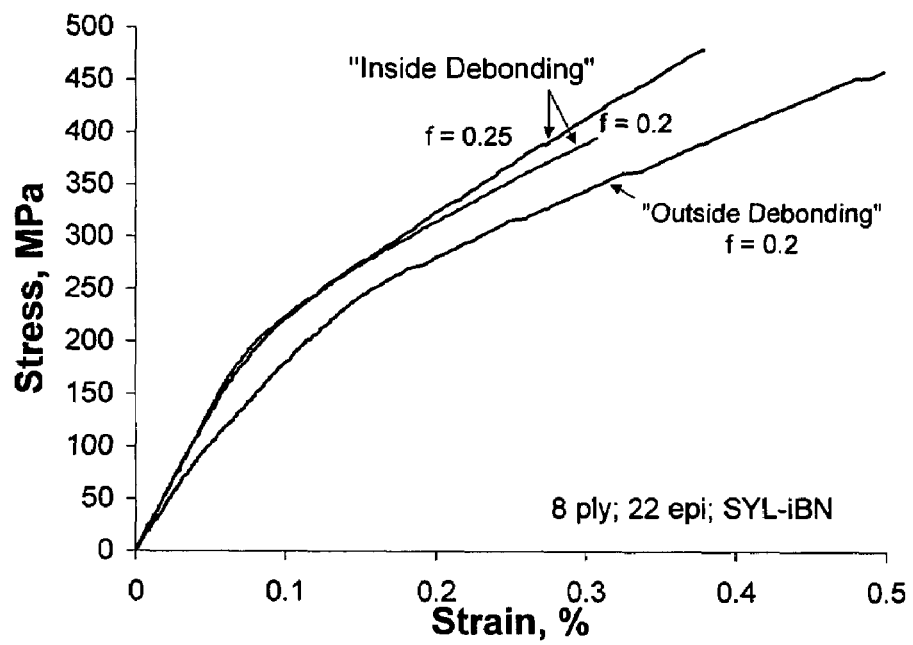
FIG. 3 illustrates the effects of inside and outside debonding on the room temperature stress-strain curves for SiC/SiC composites reinforced by "Sylramic-iBN" SiC fibers, shown in FIG. 3 (a), and "Hi-Nicalon Type S" SiC fibers, shown in FIG. 3 (b)
Figure 3:
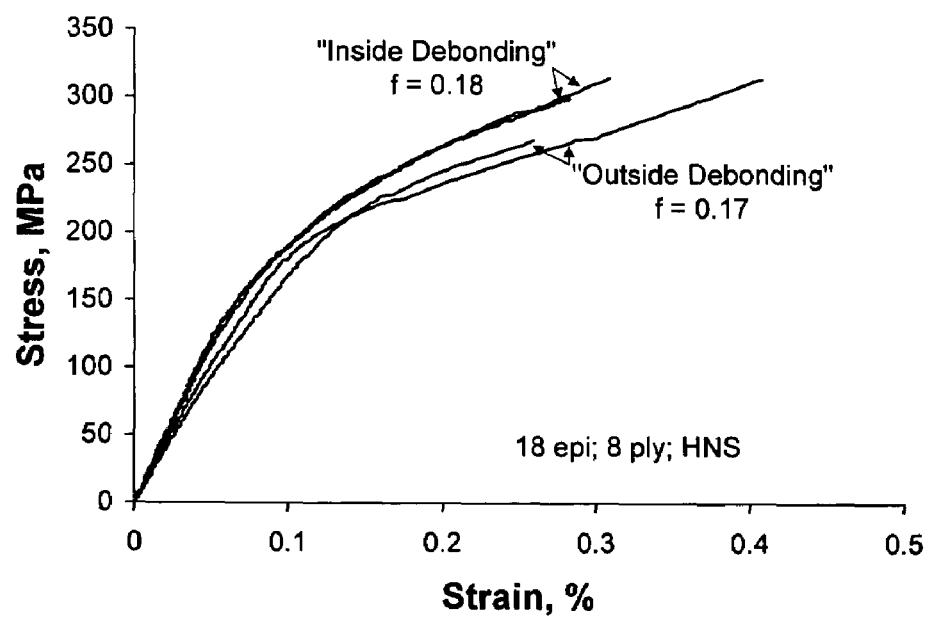
Figure 4:
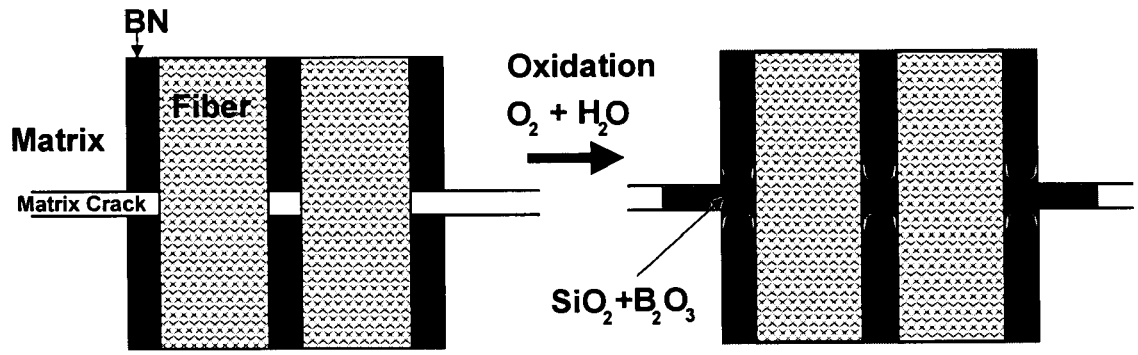
FIG. 4 provides a schematic representation of oxidation of BN-based interphases and Si-based fibers for inside debonding between the fiber and the interphase, shown in FIG. 4 (a), and of improved oxidative durability for outside debonding between the interphase and the matrix, shown in FIG. 4 (b)
Figure 4:
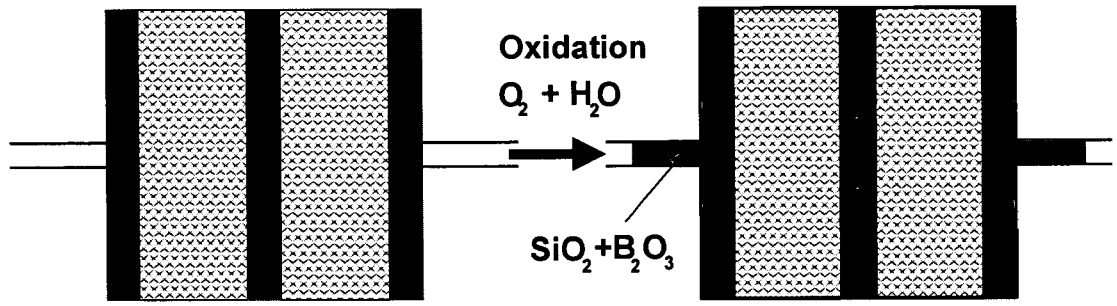

FIG. 3 compares the room-temperature stress-strain behavior for inside debonding and outside debonding SiC/SiC composites fabricated with the same fiber type and matrix type for two different fiber types. Outside debonding composites exhibit lower elastic moduli because the interphases are already debonded. Also, the outside debonding composites exhibit higher strains to failure, greater fiber pull-out (see FIG. 2), and thus better damage tolerance without losing ultimate strength. For achieving high ultimate strength and strain, any high-temperature SiC fiber type could be used for Embodiment A; whereas near-stoichiometric SiC fiber types are required for Embodiment B Improvement in SiC/SiC Composite Oxidative Durability at Intermediate Temperatures FIG. 4 shows schematically the way that outside debonding protects the SiC fibers from oxidizing and bonding strongly to each other and the SiC matrix compared to inside debonding composites. When a crack progresses through the interphase and debonds at the fiber/BN interface (inside debonding), the BN oxidizes at the crack surface and along the fiber length. This results in a layer of $SiO_2$-$B_2O_3$ glass replacing the BN interphase, which causes the fiber to be strongly bonded to contacting fibers and the matrix and poor composite life under stress-rupture testing. For outside debonding composites, the crack debonds at the already debonded BN interphase/CVI SiC matrix interface. The BN oxidizes from the outside and increases the time for oxygen to reach the fibers.

Figure 6:
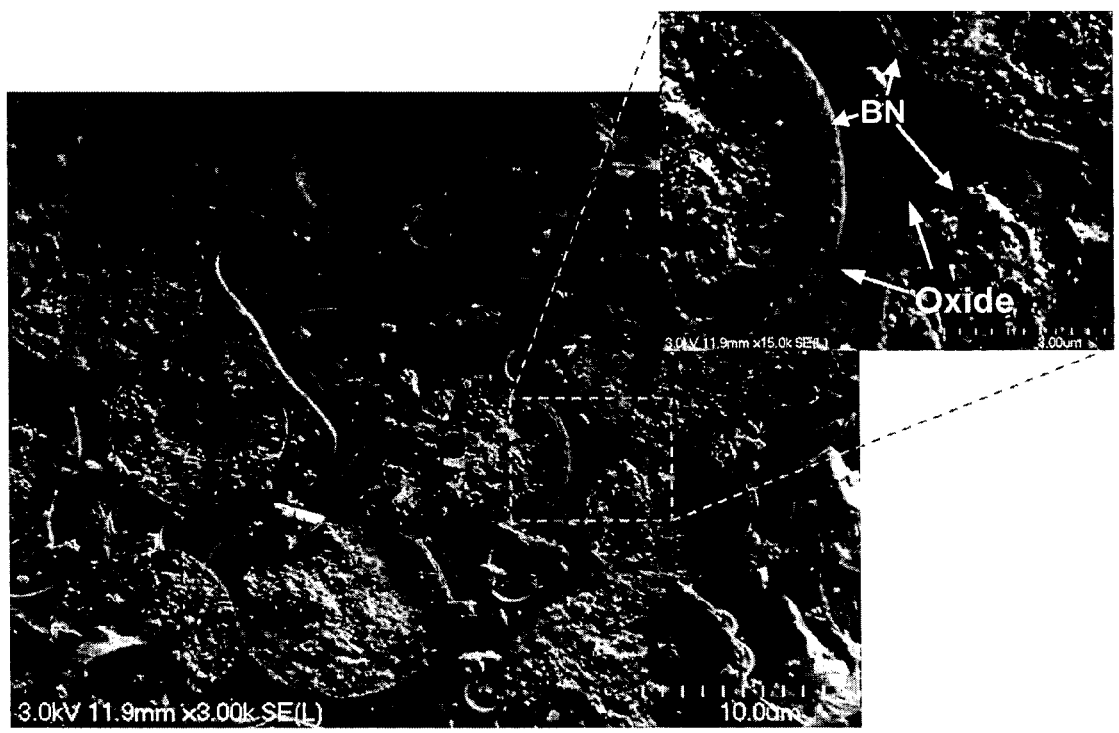
FIG. 6 provides a Scanning Electron Microscope photo of the fracture surface of an outside debonded SiC/SiC composite with a BN-based interphase after stress-rupture testing for ~100 hours at 815° C. in air.

FIG. 5 shows the improvement in stress-rupture life for two different SiC/SiC composite systems tested at 815° C. in air. For the best composite system with SYL-iBN SiC fibers, outside debonding composites enable 100 hour life at very high stresses (>250 MPa). This is nearly an improvement of two orders of magnitude in lifetime at a given stress. At lower stresses there is still improvement; however, not as dramatic. FIG. 6 confirms that the BN protects the fibers for a composite that failed after ~100 hour rupture. For traditional inside debonding composites, the BN would have been consumed near the matrix crack and replaced with a glass layer.

While the above discussion has focused on certain interphase materials between the fibers and matrix, the inventors have examined many different types of interphase, fiber, and matrix materials to show the efficacy of the present invention. Some of those constituent combinations and the employed outside-debonding (OD) embodiment are illustrated in Table 1.

TABLE 1

| SiC Fiber Type | Interphase | OD Method | SiC Matrix |
|---|---|---|---|
| Sylramic | BN | A | CVI SiC + SiC + Si |
| Sylramic-iBN | | | |
| Hi-Nicalon Type S | | | |
| Sylramic | HT Si-BN | A | CVI SiC + SiC + Si |
| Sylramic-iBN | BN | B | CVI SiC |
| Sylramic-iBN | BN/$Si_3N_4$ | A, B | CVI SiC + SiC + Si |
| Sylramic-iBN | HT BN | B | CVI SiC + Si |

The commercial sources for the various constituent materials in Table 1 are as follows: Sylramic SiC fiber: Dow Corning Corporation; Sylramic-iBN SiC fiber: Sylramic fiber with proprietary NASA treatment; Hi-Nicalon Type S SiC fiber: Nippon Carbon, Japan; BN interphase: BN from General Electric Power Systems Composites (GEPSC); HT Si-BN interphase: high-temperature Si-doped BN from Synterials Inc.; BN/$Si_3N_4$ interphase: dual layer of BN and $Si_3N_4$ from Synterials Inc.; HT BN interphase: high-temperature BN from Synterials Inc.; CVI SiC+SiC+Si matrix: CVI SiC followed by slurry infiltrated SiC particles followed by molten Si infiltration from GEPSC; CVI SiC matrix: full CVI SiC from GEPSC; CVI SiC+Si matrix: CVI SiC followed by molten Si infiltration from GEPSC and NASA.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of forming a ceramic matrix composite, the method comprising the steps of:
   selecting chemical compositions for non-oxide fibers, a thin and mechanically weak interphase material, and a non-oxide or oxide matrix;
   forming the non-oxide dimensionally-stable fibers into complex architectures;
   depositing the thin and mechanically weak interphase material on the non-oxide fibers;
   depositing the non-oxide or oxide matrix on the interphase material;
   processing the non-oxide fibers, the interphase material, and the non-oxide or oxide matrix such that, after a final composite processing, debonding or mechanical decoupling is already achieved between the interphase material and the non-oxide or oxide matrix,
   wherein fiber debonding is induced after matrix consolidation via heat treatments of thermally induced stress states that act on the fiber interphase on cool down.

2. The method as recited in claim 1, wherein the chemical compositions of the non-oxide fibers, non-oxide or oxide matrix, and an outer surface layer of the interphase or an inner surface layer of the matrix are selected so that, during composite processing, sufficient residual stress exists in the composite to debond the interphase material from the matrix while retaining a mechanical bond between the interphase and fibers.

3. The method as recited in claim 1, wherein the processing step comprises subjecting the composite to a heat treatment at a temperature that causes shrinkage of the interphase coating.

4. The method as recited in claim 3, wherein non-oxide fiber types and matrix morphologies and compositions are selected to be microstructurally stable at temperatures above the interphase formation temperature.

5. The method as recited in claim 3, wherein the non-oxide fibers comprise thermally stable chemical compositions based on at least one of silicon carbide, silicon nitride, and carbon.

6. The method as recited in claim 3, wherein the interphase material comprises chemical compositions that are non reactive with the non-oxide fibers.

7. The method as recited in claim 3, wherein the deposition temperature for the interphase material is selected to produce a dimensionally unstable interphase morphology that allows interphase shrinkage upon higher temperature exposure.

8. The method as recited in claim 3, wherein the deposition conditions for the non-oxide or oxide matrix on top of the interphase results in an initially dense matrix layer.

* * * * *